US012630239B2

(12) United States Patent
Dong et al.

(10) Patent No.: US 12,630,239 B2
(45) Date of Patent: May 19, 2026

(54) TRACK DISASSEMBLING DEVICE

(71) Applicant: Huaneng Yimin Coal-Power Co., Ltd., Hulunbuir (CN)

(72) Inventors: Shuai Dong, Hulunbuir (CN); Shuxue Li, Hulunbuir (CN); An Zheng, Hulunbuir (CN); Ji Zhang, Hulunbuir (CN); Zitao Lv, Hulunbuir (CN); Teer Ba, Hulunbuir (CN); Deyong Li, Hulunbuir (CN); Xiaoli Liu, Hulunbuir (CN); Yiming Zhang, Hulunbuir (CN); Yue Liu, Hulunbuir (CN); Jinfeng Zhang, Hulunbuir (CN); Yanbo Guo, Hulunbuir (CN); Changzhong Li, Hulunbuir (CN); Shengjie Wei, Hulunbuir (CN)

(73) Assignee: Huaneng Yimin Coal-Power Co., Ltd., Hulunbuir (CN)

(*) Notice: Subject to any disclaimer, the term of this patent is extended or adjusted under 35 U.S.C. 154(b) by 509 days.

(21) Appl. No.: 18/463,227

(22) Filed: Sep. 7, 2023

(65) Prior Publication Data

US 2024/0417932 A1    Dec. 19, 2024

(30) Foreign Application Priority Data

Jun. 13, 2023    (CN) .......................... 202310697452.9

(51) Int. Cl.
B62D 55/32        (2006.01)
B08B 3/02         (2006.01)
(Continued)

(52) U.S. Cl.
CPC ................ B62D 55/32 (2013.01); B08B 3/02 (2013.01); B21L 9/065 (2013.01); B21L 21/00 (2013.01); B25B 27/22 (2013.01); B62D 55/21 (2013.01)

(58) Field of Classification Search
CPC ........ B62D 55/32; B62D 55/21; B25B 27/22; B21L 21/00; B21L 9/065; B08B 3/02
(Continued)

(56) References Cited

U.S. PATENT DOCUMENTS 4,063,412 A * 12/1977  Bruzek ................. B25B 27/026
                                                              D8/61
4,268,019 A *  5/1981  Martin ................... B62D 55/32
                                                              269/47
(Continued)

FOREIGN PATENT DOCUMENTS

CN        111845982 A * 10/2020 ............. B62D 55/32

*Primary Examiner* — Zachary L Kuhfuss

(57) ABSTRACT

A track disassembling device comprises a protective housing, a cleaning component and a lifting pin, wherein the protective housing comprises a shell and a supporting plate, the cleaning component is movably sleeved with the protective housing and comprises a cleaning disc, a positioning rod, a connecting disc, a limit disc, a first spring and a first movable block, and the lifting pin is propped against the cleaning disc. A crank structure is formed by fitting with a connecting rod, a locating pin, a second movable block and other structures through the rotation of a turntable, and the second movable block can make reciprocating movement under the limit of the supporting plate to the second movable block; the second movable block making reciprocating movement can exert pressure on the first fixing component to form an impact when the electric telescopic rod extends, achieving separation from the axis pin.

10 Claims, 8 Drawing Sheets

(51) Int. Cl.
  B21L 9/06    (2006.01)
  B21L 21/00    (2006.01)
  *B25B 27/22*    (2006.01)
  *B62D 55/21*    (2006.01)

(58) Field of Classification Search
  USPC ................. 59/3, 7, 11; 29/252, 402.01, 428;
             305/202; 81/15.8; 180/9.1
  See application file for complete search history.

(56)        References Cited

U.S. PATENT DOCUMENTS

| | | | |
|---|---|---|---|
| 5,787,701 A * | 8/1998 | Small | B21L 21/00 |
| | | | 59/11 |
| 7,007,360 B2 * | 3/2006 | Huenefeld | B21L 21/00 |
| | | | 29/252 |
| 7,562,518 B2 * | 7/2009 | Daniels | B25B 27/04 |
| | | | 59/35.1 |
| 2003/0217453 A1 * | 11/2003 | Huenefeld | B62D 55/32 |
| | | | 29/426.4 |
| 2006/0196027 A1 * | 9/2006 | Zacharias | B62D 55/32 |
| | | | 29/252 |
| 2009/0070980 A1 * | 3/2009 | Livesay | B62D 55/21 |
| | | | 29/281.5 |

* cited by examiner

TRACK DISASSEMBLING DEVICE

CROSS-REFERENCE TO RELATED APPLICATIONS

This application claims priority of Chinese Patent Application No. 202310697452.9, filed on Jun. 13, 2023, the entire contents of which are incorporated herein by reference.

TECHNICAL FIELD

The invention relates to the technical field of industrial automation, in particular to a track disassembling device.

BACKGROUND ART

Electric shovel is a mechanical electric excavator, which transmits power by gears, chains, cable pulleys and other transmission parts and is the main equipment for open-pit mining. Due to the soft geological conditions of the open-pit mine, the electric shovel uses the track as a moving component, which can effectively increase the contact area with the ground and ensure the movement stability. However, the track will also be worn and need to be replaced in case of severe wear. Not all the track plates need to be replaced. Because the track is composed of multiple track plates connected by axis pins, the routine operation of replacing the track plates is to manually clean the soil at the joint of the track plates and then smash the axis pins out using a hammer, which is very labor-consuming and takes a long time. Therefore, the invention improves the above problems.

CONTENT OF INVENTION

This part is to outline some aspects of the embodiments of the invention and briefly describe some preferred embodiments. Simplifications or omissions may be made in this part and in the abstract and title of the invention to avoid obscuring the purpose of this part and the abstract and title of the invention, and such simplifications or omissions may not be used to limit the scope of the invention.

In view of the problems existing in the prior art, the invention is proposed.

Therefore, the technical problem to be solved in the invention is time-consuming and laborious manual disassembly of track plates.

To solve the above technical problems, the invention provides the following technical proposal: a track disassembling device comprises:

A protective housing, which comprises a shell and a supporting plate;

A cleaning component, which is movably sleeved with the protective housing (100), and comprises a cleaning disc, a first positioning rod, a connecting disc, a limit disc, a first spring and a first movable block;

A lifting pin, which is propped against the cleaning disc;

A positioning component, which comprises a first positioning plate, a second spring, a second positioning plate, a toothed ring, a thread ring, a third positioning plate, and is movably sleeved on the surface of the lifting pin;

A first fixing component, which comprises a fixing housing, a spring telescopic rod and a limit clamping block clamped at one end of the lifting pin away from the cleaning component;

A power component, which comprises a first motor, a first gear, an elliptical block, and the first motor is fixedly connected with the supporting plate;

A driving component, which comprises a second gear, a third gear and a fourth gear, and the third gear is engaged with the first gear;

A pressurizing component, which comprises a fixing block, a second positioning rod, a third spring, a movable plate, a corrugated pipe, a connecting pipe, and the fixing block is fixedly connected with the supporting plate;

A flushing component, which comprises a water storage tank, a first check valve, a sealing cover and a nozzle, and the water storage tank is fixedly installed on the top of the shell (101);

An impact component, which comprises a two-axis motor, a turntable, a connecting rod, a locating pin and a second movable block, and the two-axis motor is fixedly connected with a supporting plate;

An electric telescopic rod, which is fixedly connected with the second movable block;

A second fixing component, which comprises a limit housing, an adjusting knob, a second threaded rod, a movable sleeve rod and an extension rod, and the limit housing is fixedly connected with the two-axis motor.

As a preferred proposal for the track disassembling device of the invention, the supporting plate is fixedly installed inside the shell, and supports and limits the cleaning component, the positioning component, the first fixing component, the power component (600), the driving component, the pressurizing component and the impact component, and a plurality of supporting plates are arranged.

As a preferred proposal for the track disassembling device of the invention, one end of the first positioning rod is fixedly connected with the cleaning disc, the middle of the first positioning rod is movably connected with the connecting disc, the other end of the first positioning rod is engaged with the limit disc, the first spring is located in a groove on one side of the connecting disc, one end of the first spring is fixedly connected with the first movable block, the first movable block is movably sleeved and fixedly connected inside the limit disc, a brush is fixedly installed on one side of the cleaning disc away from the connecting disc, a ball is arranged at the contact between the cleaning disc and the lifting pin, and a handle is fixedly installed at one end of the cleaning disc far from the connection point with the first positioning rod.

As a preferred proposal for the track disassembling device of the invention, the first positioning plate, the second positioning plate and the third positioning plate are movably sleeved with the supporting plate, the supporting plate limits the toothed ring and makes the toothed ring unable to move, one side of the first positioning plate is propped against the lifting pin, two ends of the thread ring are respectively fixedly connected with the second positioning plate and the third positioning plate, and two ends of the second spring are respectively fixedly connected with the first positioning plate and the second positioning plate.

As a preferred proposal for the track disassembling device of the invention, the spring telescopic rod is annularly and fixedly installed on the inner side wall of the fixing housing at an equal angle, and is fixedly connected with the limit clamping block, an annular groove is arranged on the surface of the lifting pin near one end of the first fixing component, and the end is conical.

As a preferred proposal for the track disassembling device of the invention, the first gear and the elliptical block are successively fixed on an output shaft of the first motor, and the elliptical block is intermittently propped against the bottom of the movable plate when being driven by the first motor to rotate.

As a preferred proposal for the track disassembling device of the invention, the second gear is engaged with the connecting disc, and the fourth gear is engaged with the toothed ring.

As a preferred proposal for the track disassembling device of the invention, the corrugated pipe is connected with the connecting pipe, the second positioning rod is fixedly with the movable plate, the other end of the connecting pipe is connected with the water storage tank, the sealing cover is fixedly installed on the top of the water storage tank (901), the first check valve is fixedly installed at a corner of the top of the water storage tank, a second check valve is fixedly installed at the upper end of the nozzle, and the first check valve can only allow the outside gas to enter.

As a preferred proposal for the track disassembling device of the invention, the turntable is fixedly installed on the output shaft of the two-axis motor, the two ends of the second movable block are limited by the supporting plate, the turntable is movably sleeved with the connecting rod, the connecting rod is rotationally connected with the second movable block, and both ends of the locating pin is fixedly connected with the second movable block.

As a preferred proposal for the track disassembling device of the invention, the limit housing is movably sleeved with the adjusting knob, the adjusting knob is engaged with the second threaded rod, the second threaded rod is connected with the movable sleeve rod through threads, the movable sleeve rod is movably sleeved with the extension rod, and the fixing pin can exert pressure to the extension rod for locking when rotating.

The invention has the following beneficial effects: a crank structure is formed by fitting with the connecting rod, the locating pin, the second movable block and other structures through the rotation of the turntable, and the second movable block can make reciprocating movement under the limit of the supporting plate to the second movable block; the second movable block making reciprocating movement can exert pressure on the first fixing component to form an impact when the electric telescopic rod extends, so that separation from the axis pin is achieved, and the efficiency of disassembling the track is improved.

In the invention, by fit between the first spring and the first movable block, when the cleaning disc is controlled through the handle to rotate outward with the first positioning rod as the center, the spacing between the cleaning discs is increased, which is suitable for lifting pins of different sizes, increasing the applicability of the device; the limit disc rotates synchronously to drive the first movable block to slide along the groove on one side of the connecting disc, making the first spring compressed, so that when the lifting pin is located in the middle of the cleaning component, a certain pressure is exerted to the lifting pin under the elastic action of the first spring to perform the guide limit on the lifting pin, ensuring the stability of the lifting pin as well as the stability of the force when the axis pin is separated; the ball arranged on the cleaning disc can reduce the friction and facilitate the movement of the lifting pin along the axial direction.

In the invention, the brush scrubs the axis pin through the rotation of the whole cleaning component to achieve the purpose of cleaning, the contact with the lifting pin is ensured by the elastic action of the first spring to ensure that the axis pin is always cleaned, the elliptical block can intermittently press the movable plate upward when rotating, the corrugated pipe is compressed under the limit of the positioning rod, the internal air enters the water storage tank through the connecting pipe, so that the water inside the water storage tank is discharged through the nozzle by pressurization, and the axis pin is washed, which can improve the cleanliness on the one hand, and reduce the friction through the water on the other hand, facilitating the axis pin to be separated.

By pulling the extension rod outward, the overall length of the extension rod and the movable sleeve rod is greater than the width of the track plate, and then two movable sleeve rods are driven by the rotation of the adjusting knob to move synchronously in opposite direction and clamp the track plate; further, the extension rod is rotated by 90 degrees so that the extension rod clamps the track plate, and then the extension rod is locked by turning the fixing pin, so that the protective housing can be fixed through the whole second fixing component, and the track plate can also be fixed through the second fixing component when separating from the axis pin to ensure the stability of the overall position of the device.

DESCRIPTION OF DRAWINGS

To more clearly describe the technical proposals of the embodiments of the invention, the drawings required for the description of the embodiments are briefly introduced below. Obviously, the drawings illustrated below are only some embodiments of the invention, and the ordinary technicians in the field can obtain other drawings according to these drawings without creative labor. Among the drawings.

EMBODIMENTS

To make the above purposes, characteristics and advantages of the invention more obvious and readily understood, the embodiments of the invention are described in detail in combination with the drawings for the specification.

Many specific details are set forth in the description below to facilitate a full understanding of the invention, but the invention may also be implemented in other ways other than those described herein, and the technicians in the field may make similar generalizations without violation of the connotation of the invention, so that the invention is not limited by the embodiments disclosed below.

Next, "one embodiment" or "embodiment" herein refers to a particular feature, structure or characteristic that may be included in at least one embodiment of the invention. The expression "in one embodiment" appearing in different parts of the specification not all refers to the same embodiment, nor refers to an embodiment individually or selectively exclusive from other embodiments.

Embodiment 1

Figure 1:
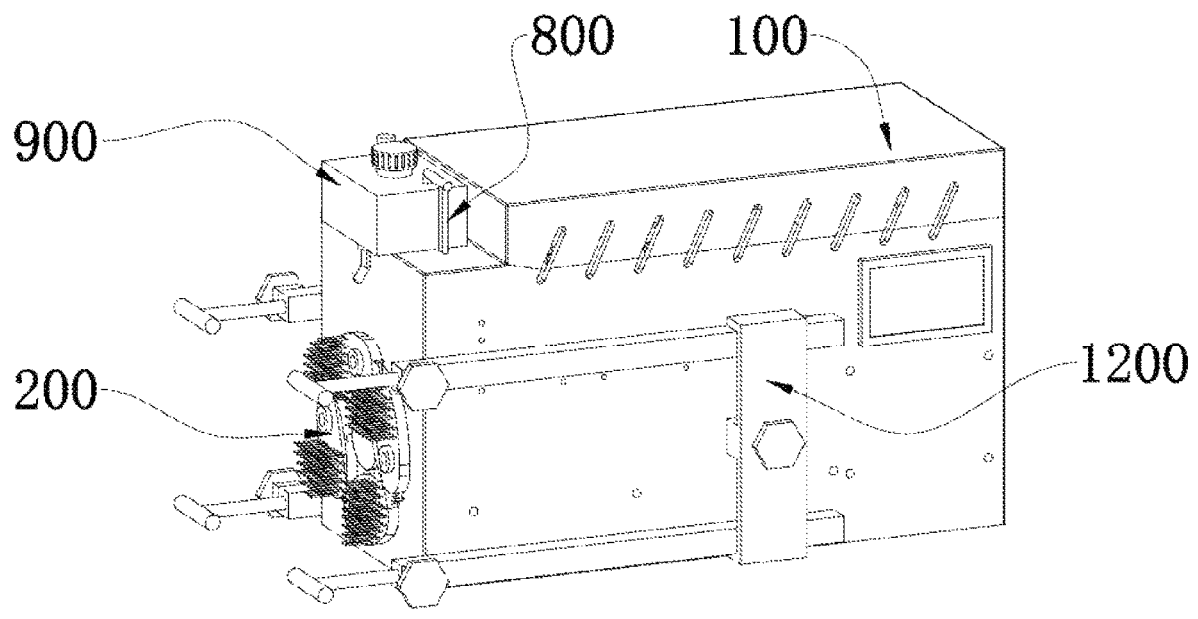
FIG. 1 shows the overall appearance of the embodiments of the invention.
Figure 2:
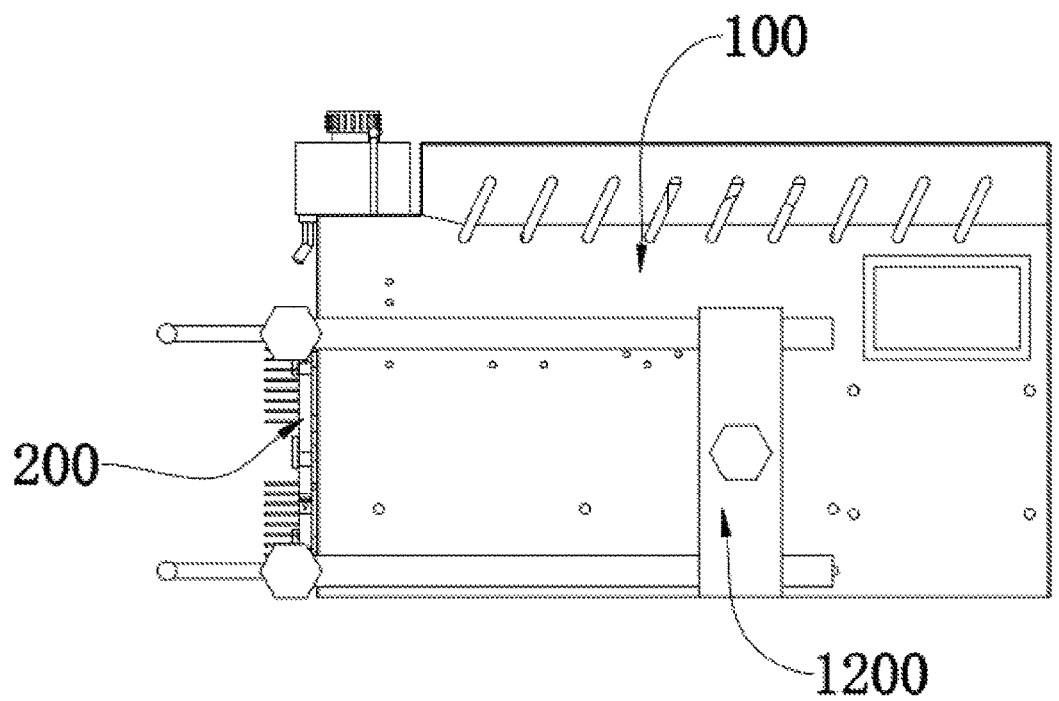
FIG. 2 is the side view in the embodiments of the invention.
Figure 3:
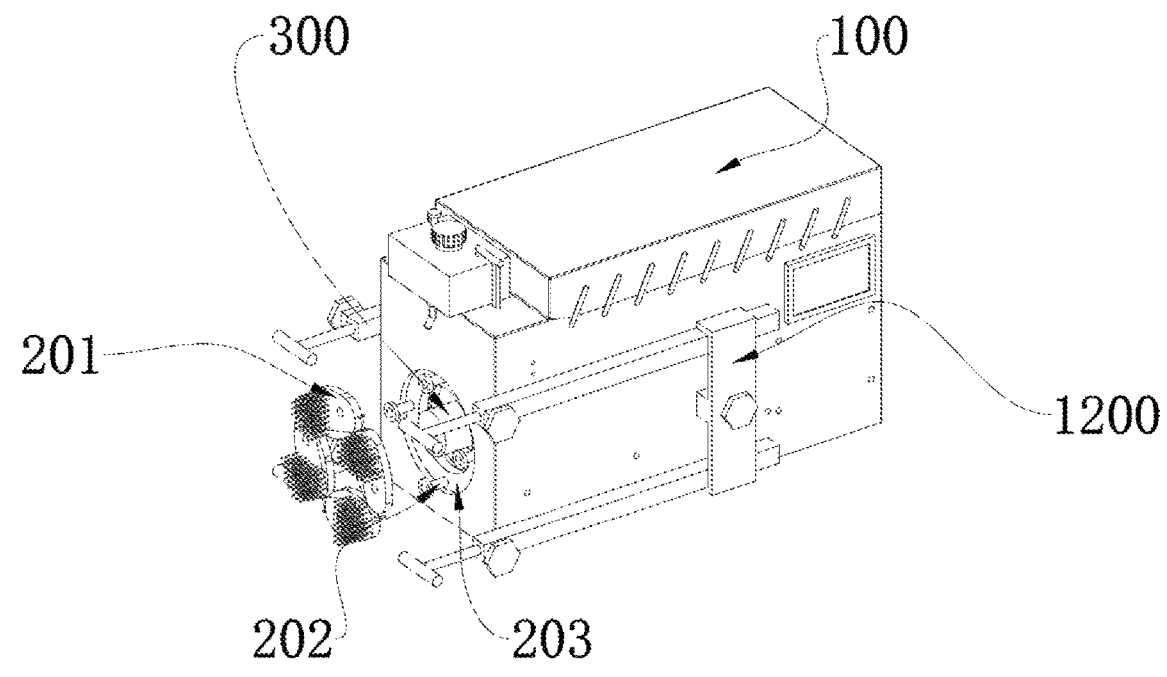
FIG. 3 is the structure separation diagram in the embodiments of the invention.
Figure 4:
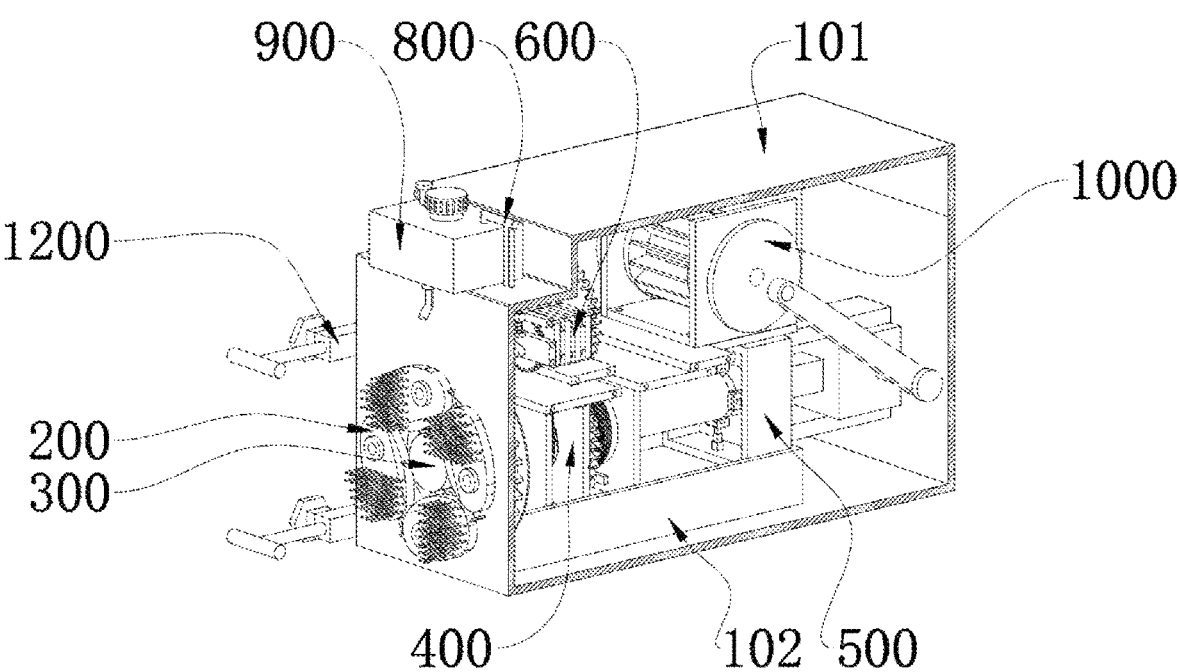
FIG. 4 is the section view for the structure side edge of the protective housing in the embodiments of the invention.
Figure 5:
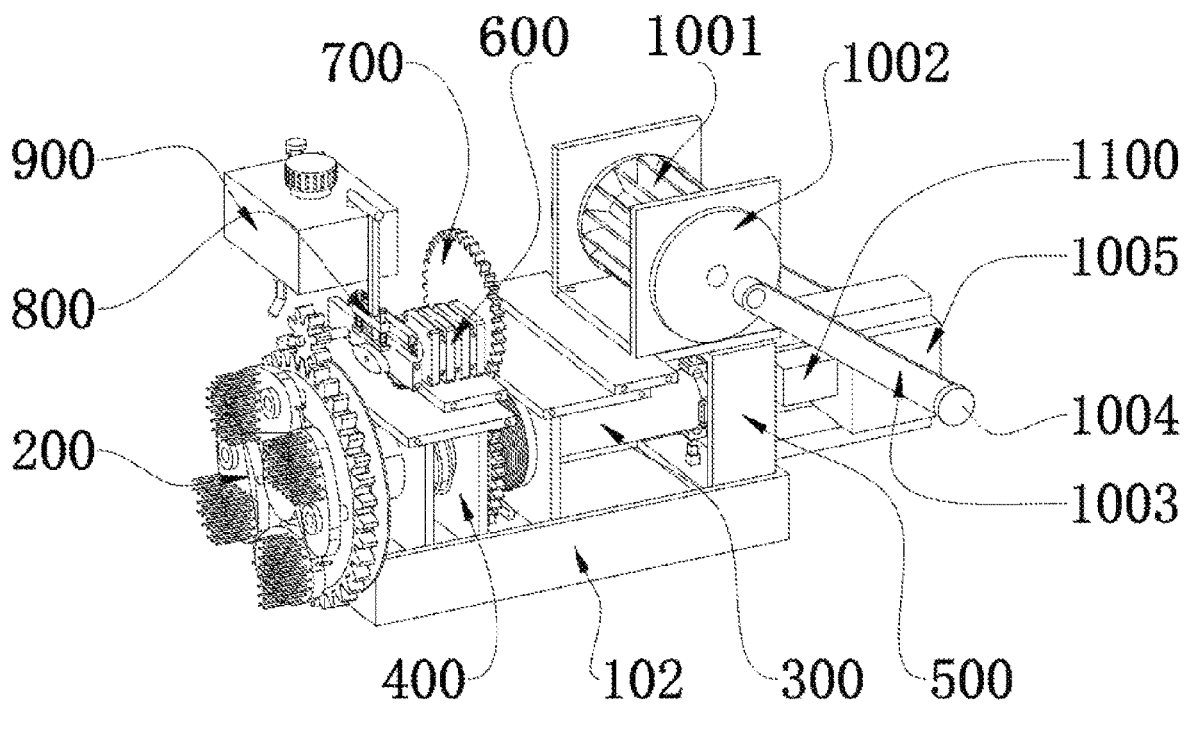
FIG. 5 is the internal structure diagram for the protective housing in the embodiments of the invention.
Figure 6:
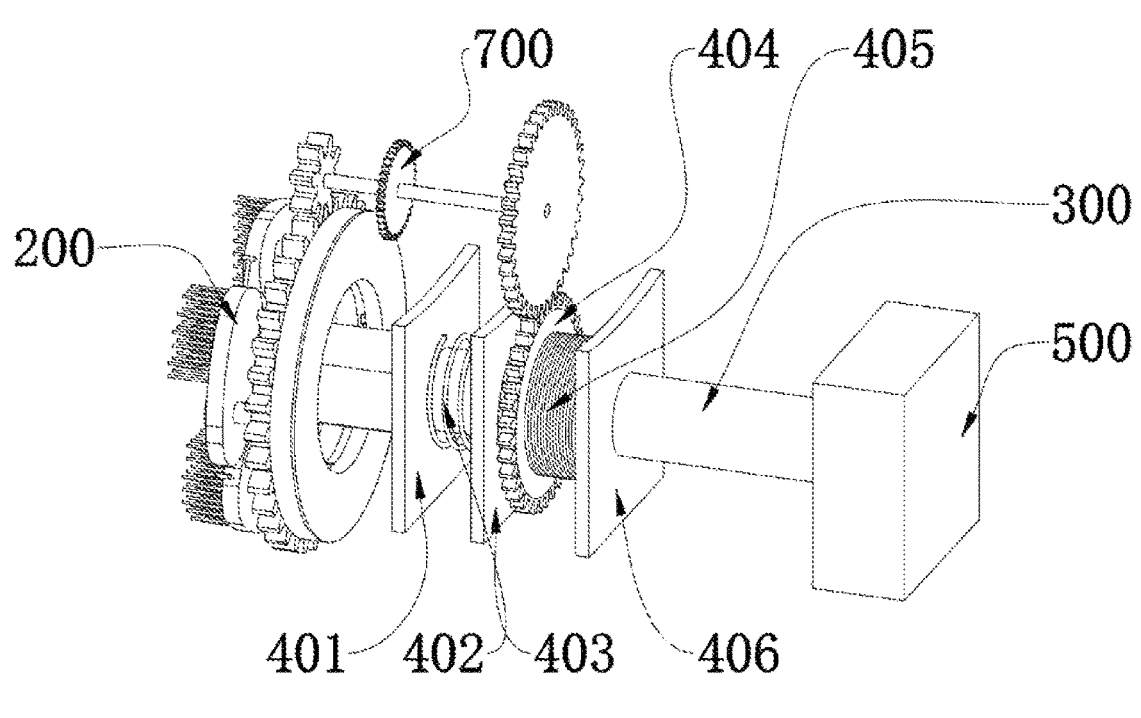
FIG. 6 is the structure subdivision diagram for the positioning component in the embodiments of the invention.
Figure 7:
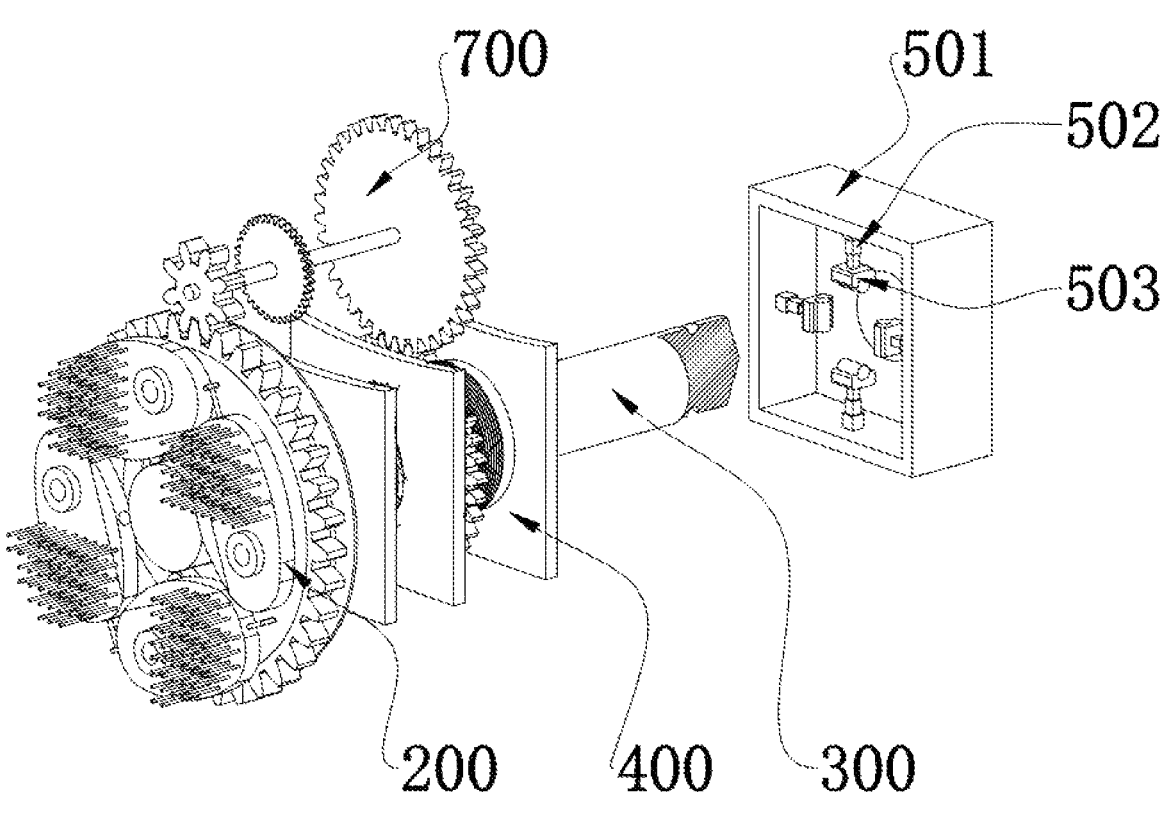
FIG. 7 is the local section view for the lifting pin in the embodiments of the invention.
Figure 8:
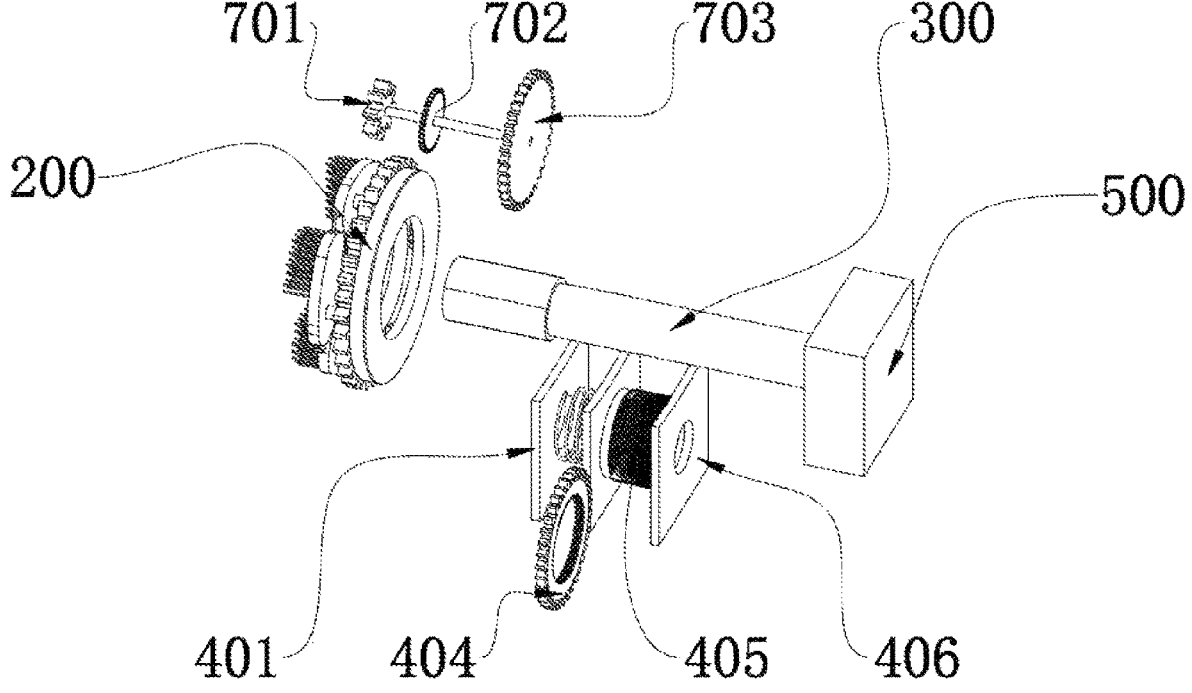
FIG. 8 is the structure subdivision diagram for the driving component in the embodiments of the invention.
Figure 9:
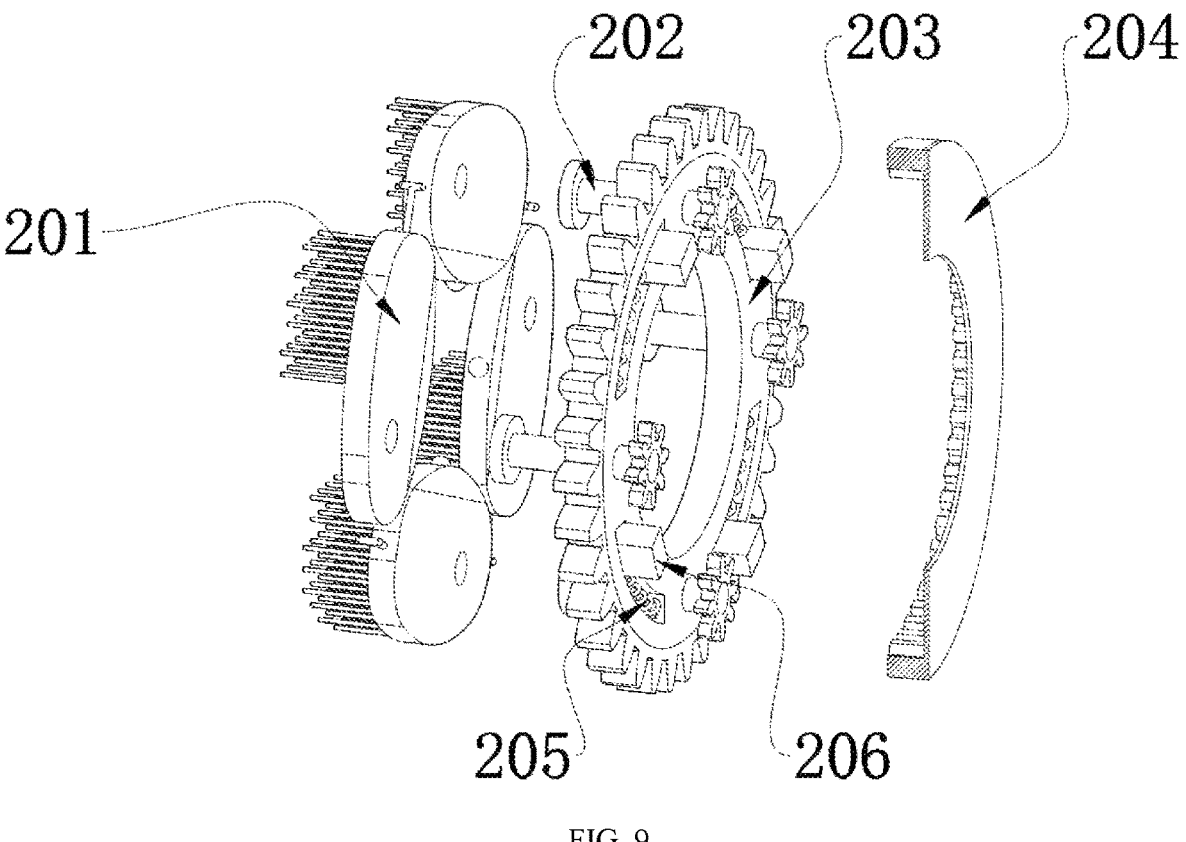
FIG. 9 is the structure subdivision diagram for the cleaning component in the embodiments of the invention.
Figure 10:
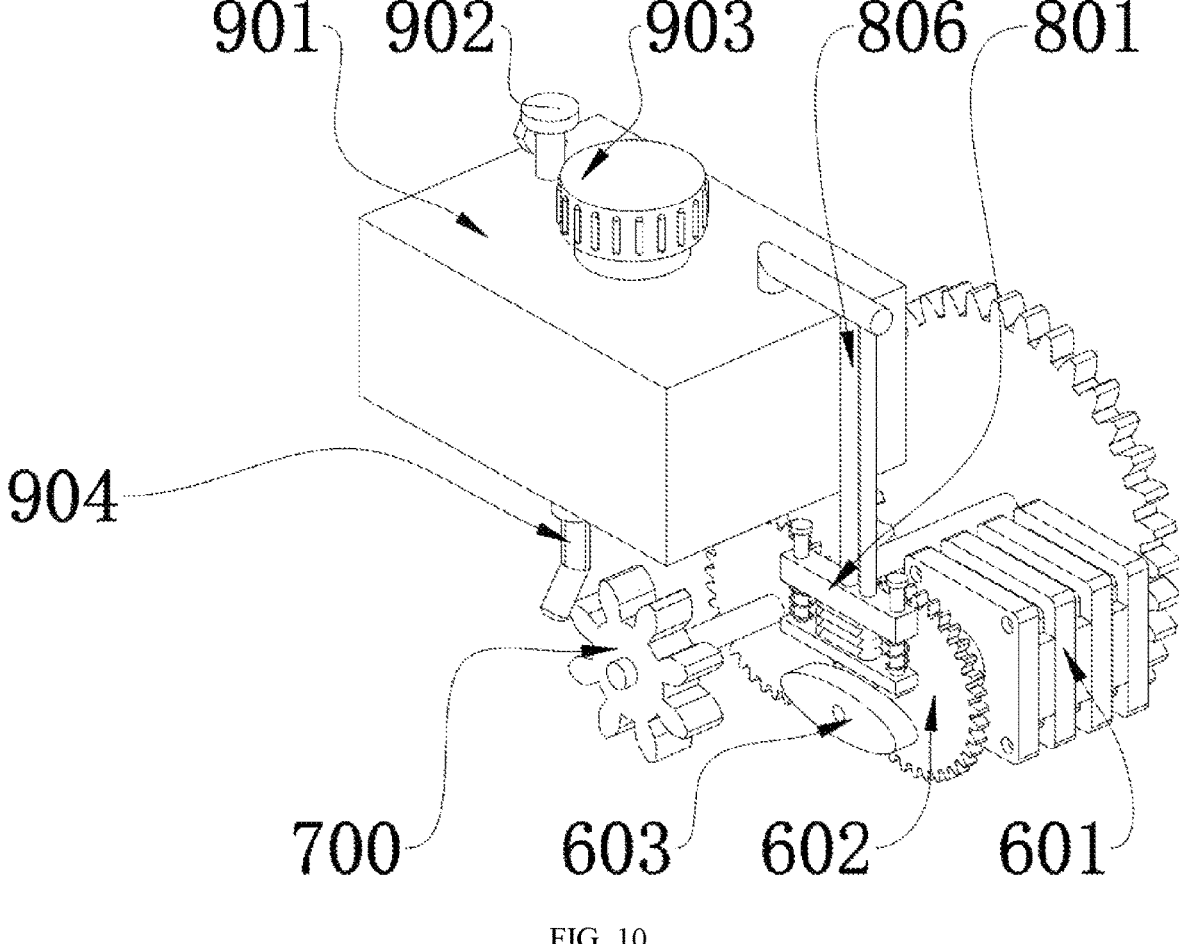
FIG. 10 is the structure subdivision diagram for the power component in the embodiments of the inventio is the n.
Figure 11:
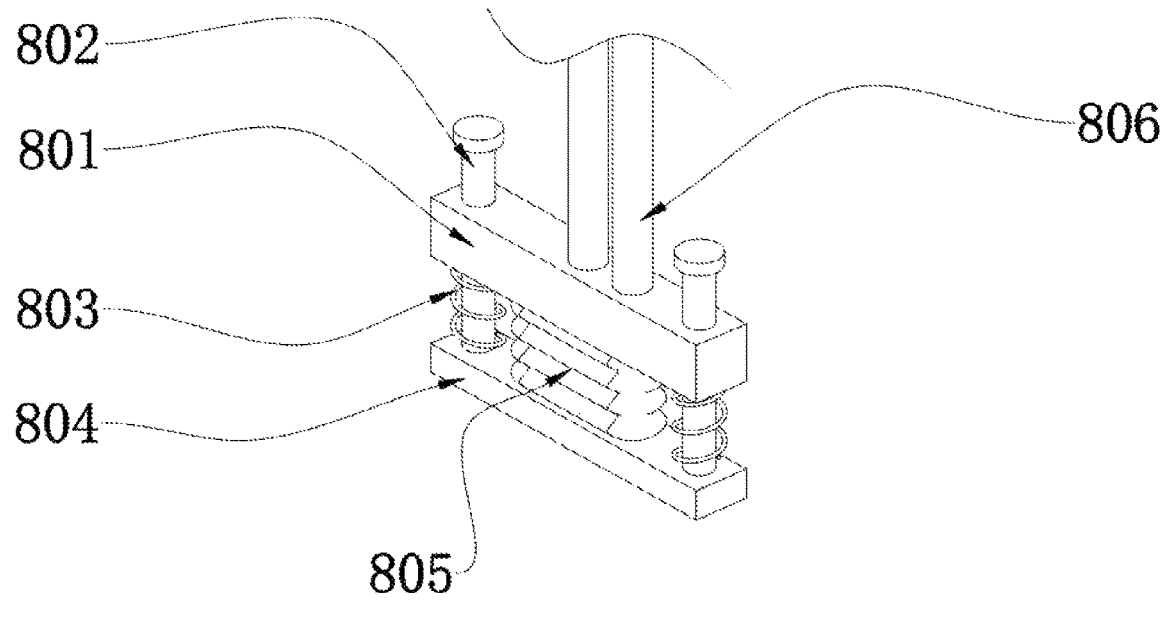
FIG. 11 is the structure subdivision diagram for the pressurizing component in the embodiments of the invention.
Figure 12:
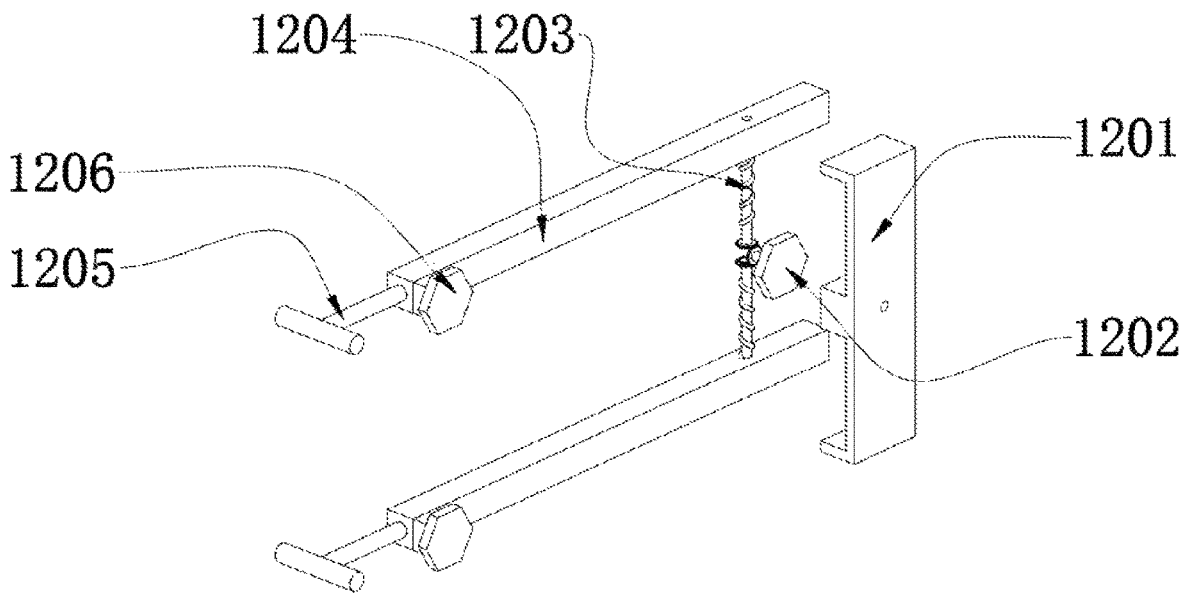
FIG. 12 is the structure subdivision diagram for the fixing component in the embodiments of the invention.

FIG. 1 to FIG. 12 show the first embodiment of the invention, which provides a track disassembly device, comprising:

A protective housing 100, which comprises a shell 101 and a supporting plate 102; a cleaning component 200, which is movably sleeved with the protective housing 100, and comprises a cleaning disc 201, a first positioning rod 202, a connecting disc 203, a limit disc 204, a first spring 205 and a first movable block 206; a lifting pin 300, which is propped against the cleaning disc 201; a positioning component 400, which comprises a first positioning plate 401, a second spring 402, a second positioning plate 403, a toothed ring 404, a thread ring 405, a third positioning plate 406, and is movably sleeved on the surface of the lifting pin 300; a first fixing component 500, which comprises a fixing housing 501, a spring telescopic rod 502 and a limit clamping block 503 clamped at one end of the lifting pin 300 away from the cleaning component 200; a power component 600, which comprises a first motor 601, a first gear 602, an elliptical block 603, and the first motor 601 is fixedly connected with the supporting plate 102; a driving component 700, which comprises a second gear 701, a third gear 702 and a fourth gear 703, and the third gear 702 is engaged with the first gear 602; a pressurizing component 800, which comprises a fixing block 801, a second positioning rod 802, a third spring 803, a movable plate 804, a corrugated pipe 805, a connecting pipe 806, and the fixing block 801 is fixedly connected with the supporting plate 102; a flushing component 900, which comprises a water storage tank 901, a first check valve 902, a sealing cover 903 and a nozzle 904, and the water storage tank 901 is fixedly installed on the top of the shell 101; an impact component 1000, which comprises a two-axis motor 1001, a turntable 1002, a connecting rod 1003, a locating pin 1004 and a second movable block 1005, and the two-axis motor 1001 is fixedly connected with a supporting plate 102; an electric telescopic rod 1100, which is fixedly connected with the second movable block 1005; a second fixing component 1200, which comprises a limit housing 1201, an adjusting knob 1202, a second threaded rod 1203, a movable sleeve rod 1204 and an extension rod 1205, and the limit housing 1201 is fixedly connected with the two-axis motor 1001.

The driving component 700 can be driven to rotate by starting the power component 600 and synchronously drives the toothed ring 404 and the cleaning component 200 to rotate, the soil attached to the axis pin can be removed by the rotation of the cleaning component 200 to facilitate observation, and the toothed ring 404 is limited by the supporting plate 102 during rotation to ensure that the toothed ring 404 can only rotate, so that the thread ring 405 moves along the axial direction of the lifting pin 300 when the toothed ring 404 rotates, and therefore the lifting pin 300 is driven to be close to the axis pin by propping the first positioning plate 401 against the lifting pin 300; moreover, when the lifting pin 300 is in contact with the axis pin, pressure is exerted again, the positions of the lifting pin 300 and the first positioning plate 401 are unchanged, and the second spring 402 is gradually compressed to ensure the stability of the structure; meanwhile, the movable plate 804 can be intermittently pressed upward due to the rotation of the elliptical block 603, the corrugated pipe 805 is compressed under the limit of the second positioning rod 802, and the internal air enters the water storage tank 901 through the connecting pipe 806, so that the water inside the water storage tank 901 is discharged through the nozzle 904 by pressurization to wash the axis pin, which improves the cleanliness on the one hand, and reduces the friction through water to facilitate the separation of the axis pin; when in use, the two-axis motor 1001 drives the turntable 1002 to rotate, and forms a crank structure with the connecting rod 1003, the positioning pin 1004, the second movable block 1005 and other structures, and the limit of the supporting plate 102 ensures that the second movable block 1005 can move stably in the horizontal direction to ensure the stability of the structure; furthermore, when the two-axis motor 1001 works, the electric telescopic rod 1100 also extends synchronously, so that the electric telescopic rod 1100 can gradually impact the first fixing component 500, and the first fixing component 500 transfers the force to the lifting pin 300 to push the axis pin out.

The supporting plate 102 is fixedly installed inside the shell 101, and supports and limits the cleaning component 200, the positioning component 400, the first fixing component 500, the power component 600, the driving component 700, the pressurizing component 800 and the impact component 1000, and a plurality of supporting plates 102 are arranged.

The supporting plate 102 has different sizes for different structures, and the supporting plate 102 supports and limits the internal structure of the shell 101 to ensure the stability and rationality of the structure.

The turntable 1002 is fixedly installed on the output shaft of the two-axis motor 1001, the two ends of the second movable block 1005 are limited by the supporting plate 102, the turntable 1002 is movably sleeved with the connecting rod 1003, the connecting rod 1003 is rotationally connected with the second movable block 1005, and both ends of the locating pin 1004 is fixedly connected with the second movable block 1005.

The two-axis motor 1001 is supported by the supporting plate 102 to ensure the stability of the position, and forms a crank structure with the connecting rod 1003, the positioning pin 1004, the second movable block 1005 and other structures through the rotation of the turntable 1002, and the second movable block 1005 can make reciprocating movement under the limit of the supporting plate 102 to the second movable block 1005; meanwhile, the second movable block 1005 making reciprocating movement can exert pressure on the first fixing component 500 and the lifting pin 300 when the electric telescopic rod 1100 extends, so that separation from the axis pin is achieved.

Embodiment 2

FIG. 4 to FIG. 11 show the second embodiment of the invention, which is based on the previous embodiment.

One end of the first positioning rod 202 is fixedly connected with the cleaning disc 201, the middle of the first positioning rod 202 is movably connected with the connecting disc 203, the other end of the first positioning rod 202 is engaged with the limit disc 204, the first spring 205 is located in a groove on one side of the connecting disc 203, one end of the first spring 205 is fixedly connected with the first movable block 206, the first movable block 206 is movably sleeved and fixedly connected inside the limit disc 204, a brush is fixedly installed on one side of the cleaning disc 201 away from the connecting disc 203, a ball is arranged at the contact between the cleaning disc 201 and the lifting pin 300, and a handle is fixedly installed at one end of the cleaning disc 201 far from the connection point with the first positioning rod 202.

By fit between the first spring 205 and the first movable block 206, when the cleaning disc 201 is controlled through the handle to rotate outward with the first positioning rod 202 as the center, the limit disc 204 rotates synchronously and then drives the first movable block 206 to slide along the groove on one side of the connecting disc 203, making the first spring 205 compressed, so that when the lifting pin 300 is located in the middle of the cleaning component 200, the guide limit can be performed on the lifting pin 300 through the cleaning disc 201 to ensure the stability of the lifting pin 300 as well as the stability of the force when the axis pin is separated; the ball arranged on the cleaning disc 201 can reduce the friction and facilitate the movement of the lifting pin 300 along the axial direction, which is suitable for lifting pin 300 of different sizes, increasing the applicability of the device.

The first gear 602 and the elliptical block 603 are successively fixed on an output shaft of the first motor 601, the elliptical block 603 is intermittently propped against the bottom of the movable plate 804 when being driven by the first motor 601 to rotate, the second gear 701 is engaged with the connecting disc 203, the fourth gear 703 is engaged with the toothed ring 404, the corrugated pipe 805 is connected with the connecting pipe 806, the second positioning rod 802 is fixedly with the movable plate 804, the other end of the connecting pipe 806 is connected with the water storage tank 901, the sealing cover 903 is fixedly installed on the top of the water storage tank 901, the first check valve 902 is fixedly installed at a corner of the top of the water storage tank 901, a second check valve is fixedly installed at the upper end of the nozzle 904, and the first check valve 902 can only allow the outside gas to enter.

The brush scrubs the axis pin through the rotation of the whole cleaning component 200 to achieve the purpose of cleaning, the rotation of the cleaning component 200 is driven by the driving component 700 and the power component 600, the first motor 601 is started to drive the first gear 602 and the elliptical block 603 to rotate, and the first gear 602 drives the driving component 700 to drive the connecting disc 203 to rotate, so that the whole cleaning component 200 rotates to achieve the purpose of rotary cleaning; synchronously, the elliptical block 603 can intermittently press the movable plate 804 upward when rotating, the corrugated pipe 805 is compressed under the limit of the positioning rod 802, the internal air enters the water storage tank 901 through the connecting pipe 806, so that the water inside the water storage tank 901 is discharged through the nozzle 904 by pressurization, and the axis pin is washed, which can improve the cleanliness on the one hand, and reduce the friction through the water on the other hand, facilitating the axis pin to be separated; the fixing block 801 is fixed by the supporting plate 102 to ensure the stability of the structure.

The first positioning plate 401, the second positioning plate 403 and the third positioning plate 406 are movably sleeved with the supporting plate 102, the supporting plate 102 limits the toothed ring 404 and makes the toothed ring

404 unable to move, one side of the first positioning plate 401 is propped against the lifting pin 300, two ends of the thread ring 405 are respectively fixedly connected with the second positioning plate 403 and the third positioning plate 406, and two ends of the second spring 402 are respectively fixedly connected with the first positioning plate 401 and the second positioning plate 403.

When the driving component 700 is driven by the power component 600 to rotate, the fourth gear 703 can drive the toothed ring 404 to rotate, the thread ring 405 moves along the axial direction of the lifting pin 300 due to the limit of the supporting plate 102 to the toothed ring 404 when the toothed ring 404 rotates, and therefore the lifting pin 300 is driven to be close to the axis pin by propping the first positioning plate 401 against the lifting pin 300 to facilitate force exertion and ensure a more stable structure; when the lifting pin 300 is in contact with the axis pin, pressure is exerted again, the positions of the lifting pin 300 and the first positioning plate 401 are unchanged by the gradual compression of the second spring 402 to ensure the stability of the structure.

The spring telescopic rod 502 is annularly and fixedly installed on the inner side wall of the fixing housing 501 at an equal angle, and is fixedly connected with the limit clamping block 503, an annular groove is arranged on the surface of the lifting pin 300 near one end of the first fixing component 500, and the end is conical.

The lifting pin 300 with an annular groove on the surface can be limited under pressure after entering the inside of the first fixing component 500 to ensure the stability during use, and the conical surface can push the limit clamping block 503 to compress the spring telescopic rod 502 for easy placement.

Embodiment 3

FIG. 1 to FIG. 3 and FIG. 12 show the second embodiment of the invention, which is based on the previous embodiment.

The limit housing 1201 is movably sleeved with the adjusting knob 1202, the adjusting knob 1202 is engaged with the second threaded rod 1203, the second threaded rod 1203 is connected with the movable sleeve rod 1204 through threads, the movable sleeve rod 1204 is movably sleeved with the extension rod 1205, and the fixing pin 1206 can exert pressure to the extension rod 1205 for locking when rotating.

By pulling the extension rod 1205 outward, the overall length of the extension rod 1205 and the movable sleeve rod 1204 is greater than the width of the track plate, and then two movable sleeve rods 1204 are driven by the rotation of the adjusting knob 1202 to move synchronously in opposite direction and clamp the track plate; further, the extension rod 1205 is rotated by 90 degrees so that the extension rod 1205 clamps the track plate, and then the extension rod 1205 is locked by turning the fixing pin 1206, so that the protective housing 100 can be fixed through the whole second fixing component 1200, and the track plate can also be fixed through the second fixing component 1200 when separating from the axis pin to ensure the stability of the overall position of the device.

It is important to note that the structure and layout of the application shown in multiple different exemplary embodiments are only exemplary. Although only a few embodiments are described in detail in the invention, it should be easily understood by those reading the invention that modifications are possible, e.g., dimensions, scales, structures, shapes and proportions of various components, and parameter values such as temperature and pressure, installation layout, material use, color, orientation changes, etc. without substantial deviation from the novel instructions and advantages of the subject described in the application. For example, a component formed into a whole may consist of a plurality of parts or components, the components may be inverted or the position thereof may be otherwise changed, and nature or number or position of discrete components may be altered or changed. Therefore, all such modifications are intended to be included within the scope of the invention. The order or sequence of any process or method steps may be changed or reordered according to alternative embodiments. Any term of "device plus function" in the claims is intended to cover the functioning structure described herein, and is not only structurally equivalent but also an equivalent structure. other substitutions, modifications, changes and omissions may be made in the design, operation and arrangement of the exemplary embodiments without deviation from the scope of the invention. Therefore, the invention is not limited to a particular embodiment, but extended to a variety of modifications that still fall within the scope of the attached claims.

In addition, to provide a concise description of the exemplary embodiments, all features of the actual embodiment may not be described, that is, those features irrelevant to the optimal mode currently considered for implementing the invention, or those features irrelevant to the realization of the invention.

It should be understood that a large number of decisions on embodiments can be made during the development of any practical embodiments, such as in any engineering or design project. Such development efforts may be complex and time-consuming, but the ordinary technicians who benefit from the invention do not need more experiences, and the development effort will be a routine work for design, manufacturing and production.

It should be noted that the above embodiments are used only to describe the technical proposal of the invention and not to limit it, and that although the invention is described in detail by reference to the preferred embodiments, the ordinary technicians in the field should understand that the technical proposal of the invention may be modified or equivalently substituted without deviation from the spirit and scope of the technical proposal of the invention, and such modifications or equivalent substitutions should be covered within the scope of the claims of the invention.

The invention claimed is:

1. A track disassembling device, characterized by comprising:

a protective housing (100), which comprises a shell (101) and a supporting plate (102);

a cleaning component (200), which is movably sleeved with the protective housing (100), and comprises a cleaning disc (201), a first positioning rod (202), a connecting disc (203), a limit disc (204), a first spring (205) and a first movable block (206);

a lifting pin (300), which is propped against the cleaning disc (201);

a positioning component (400), which comprises a first positioning plate (401), a second spring (402), a second positioning plate (403), a toothed ring (404), a thread ring (405), a third positioning plate (406), and is movably sleeved on the surface of the lifting pin (300);

a first fixing component (500), which comprises a fixing housing (501), a spring telescopic rod (502) and a limit clamping block (503) clamped at one end of the lifting pin (300) away from the cleaning component (200);

a power component (600), which comprises a first motor (601), a first gear (602), an elliptical block (603), and the first motor (601) is fixedly connected with the supporting plate (102);

a driving component (700), which comprises a second gear (701), a third gear (702) and a fourth gear (703), and the third gear (702) is engaged with the first gear (602);

a pressurizing component (800), which comprises a fixing block (801), a second positioning rod (802), a third spring (803), a movable plate (804), a corrugated pipe (805), a connecting pipe (806), and the fixing block (801) is fixedly connected with the supporting plate (102);

a flushing component (900), which comprises a water storage tank (901), a first check valve (902), a sealing cover (903) and a nozzle (904), and the water storage tank (901) is fixedly installed on the top of the shell (101);

an impact component (1000), which comprises a two-axis motor (1001), a turntable (1002), a connecting rod (1003), a locating pin (1004) and a second movable block (1005), and the two-axis motor (1001) is fixedly connected with a supporting plate (102);

an electric telescopic rod (1100), which is fixedly connected with the second movable block (1005);

a second fixing component (1200), which comprises a limit housing (1201), an adjusting knob (1202), a second threaded rod (1203), a movable sleeve rod (1204) and an extension rod (1205), and the limit housing (1201) is fixedly connected with the two-axis motor (1001).

2. The track disassembling device according to claim 1, characterized in that the supporting plate (102) is fixedly installed inside the shell (101), and supports and limits the cleaning component (200), the positioning component (400), the first fixing component (500), the power component (600), the driving component (700), the pressurizing component (800) and the impact component (1000), and a plurality of supporting plates (102) are arranged.

3. The track disassembling device according to claim 1, characterized in that one end of the first positioning rod (202) is fixedly connected with the cleaning disc (201), the middle of the first positioning rod (202) is movably connected with the connecting disc (203), the other end of the first positioning rod (202) is engaged with the limit disc (204), the first spring (205) is located in a groove on one side of the connecting disc (203), one end of the first spring (205) is fixedly connected with the first movable block (206), the first movable block (206) is movably sleeved and fixedly connected inside the limit disc (204), a brush is fixedly installed on one side of the cleaning disc (201) away from the connecting disc (203), a ball is arranged at the contact between the cleaning disc (201) and the lifting pin (300), and a handle is fixedly installed at one end of the cleaning disc (201) far from the connection point with the first positioning rod (202).

4. The track disassembling device according to claim 1, characterized in that the first positioning plate (401), the second positioning plate (403) and the third positioning plate (406) are movably sleeved with the supporting plate (102), the supporting plate (102) limits the toothed ring (404) and makes the toothed ring (404) unable to move, one side of the first positioning plate (401) is propped against the lifting pin (300), two ends of the thread ring (405) are respectively fixedly connected with the second positioning plate (403) and the third positioning plate (406), and two ends of the second spring (402) are respectively fixedly connected with the first positioning plate (401) and the second positioning plate (403).

5. The track disassembling device according to claim 1, characterized in that the spring telescopic rod (502) is annularly and fixedly installed on the inner side wall of the fixing housing (501) at an equal angle, and is fixedly connected with the limit clamping block (503), an annular groove is arranged on the surface of the lifting pin (300) near one end of the first fixing component (500), and the end is conical.

6. The track disassembling device according to claim 1, characterized in that the first gear (602) and the elliptical block (603) are successively fixed on an output shaft of the first motor (601), and the elliptical block (603) intermittently presses the bottom of the movable plate (804) when being driven by the first motor (601) to rotate.

7. The track disassembling device according to claim 1, characterized in that the second gear (701) is engaged with the connecting disc (203), and the fourth gear (703) is engaged with the toothed ring (404).

8. The track disassembling device according to claim 1, characterized in that the corrugated pipe (805) is connected with the connecting pipe (806), the second positioning rod (802) is fixedly with the movable plate (804), the other end of the connecting pipe (806) is connected with the water storage tank (901), the sealing cover (903) is fixedly installed on the top of the water storage tank (901), the first check valve (902) is fixedly installed at a corner of the top of the water storage tank (901), a second check valve is fixedly installed at the upper end of the nozzle (904), and the first check valve (902) can only allow the outside gas to enter.

9. The track disassembling device according to claim 1, characterized in that the turntable (1002) is fixedly installed on the output shaft of the two-axis motor (1001), the two ends of the second movable block (1005) are limited by the supporting plate (102), the turntable (1002) is movably sleeved with the connecting rod (1003), the connecting rod (1003) is rotationally connected with the second movable block (1005), and both ends of the locating pin (1004) is fixedly connected with the second movable block (1005).

10. The track disassembling device according to claim 1, characterized in that the limit housing (1201) is movably sleeved with the adjusting knob (1202), the adjusting knob (1202) is engaged with the second threaded rod (1203), the second threaded rod (1203) is connected with the movable sleeve rod (1204) through threads, the movable sleeve rod (1204) is movably sleeved with the extension rod (1205), and the fixing pin (1206) can exert pressure to the extension rod (1205) for locking when rotating.

* * * * *